(12) United States Patent
Silverbrook

(10) Patent No.: US 7,224,274 B2
(45) Date of Patent: May 29, 2007

(54) LOCALITY INFORMATION RETRIEVAL SYSTEM

(75) Inventor: Kia Silverbrook, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 176 days.

(21) Appl. No.: 10/503,923

(22) PCT Filed: Feb. 12, 2003

(86) PCT No.: PCT/AU03/00159

§ 371 (c)(1),
(2), (4) Date: Aug. 9, 2004

(87) PCT Pub. No.: WO03/069280

PCT Pub. Date: Aug. 21, 2003

(65) Prior Publication Data
US 2005/0088322 A1    Apr. 28, 2005

(30) Foreign Application Priority Data
Feb. 13, 2002  (AU) .................................. PS0496

(51) Int. Cl.
*G08B 1/08* (2006.01)
*B41J 3/00* (2006.01)

(52) U.S. Cl. .............................. 340/539.13; 340/995.1; 340/995.26; 340/425.5; 701/200; 342/2

(58) Field of Classification Search ........... 340/539.13; 347/2, 4
See application file for complete search history.

(56) References Cited

U.S. PATENT DOCUMENTS

| | | | | |
|---|---|---|---|---|
| 5,197,009 A * | 3/1993 | Hoffman et al. | ............ | 701/200 |
| 5,555,172 A * | 9/1996 | Potter | ...................... | 455/456.1 |
| 5,557,524 A * | 9/1996 | Maki | ........................... | 701/35 |
| 5,682,525 A * | 10/1997 | Bouve et al. | ............ | 707/104.1 |
| 5,767,795 A | 6/1998 | Schaphorst | | |
| 6,140,943 A | 10/2000 | Levine | | |
| 6,243,030 B1 | 6/2001 | Levine | | |
| 6,282,489 B1 * | 8/2001 | Bellesfield et al. | ......... | 701/201 |
| 6,351,710 B1 * | 2/2002 | Mays | ......................... | 701/211 |
| 6,694,252 B2 * | 2/2004 | Ukita | ........................ | 701/205 |

\* cited by examiner

*Primary Examiner*—Donnie L. Crosland

(57) ABSTRACT

An information retrieval system for retrieving information relating to a locality includes a data collecting module for collecting data relating to a location of the device and the locality in which the device is located. A processor, which is in communication with the data collecting module, processes the collected data to provide formatted data suitable for printing. A printing unit is associated with the device for printing the formatted data to provide information relating to the locality.

18 Claims, 14 Drawing Sheets

LOCALITY INFORMATION RETRIEVAL SYSTEM

The present application is a 371 of PCT/AU03/00159 filed on Feb. 12, 2003.

FIELD OF THE INVENTION

The present invention relates to an information retrieval system, and more particularly to such a system installed in a conveyance and to a method of retrieving information from within a conveyance.

In this specification, unless the context clearly indicates otherwise, the term "conveyance" is to be understood in a broad sense as including any device for conveying persons and/or goods, and includes road vehicles, aircraft, rail vehicles, waterborne craft, spacecraft, and the like.

BACKGROUND OF THE INVENTION

Vehicle navigation systems provide directions based on automatically determined knowledge of a vehicle's current position. Vehicle navigation systems are becoming standard equipment in certain types of vehicles in a large number of countries.

Prior to the introduction of vehicle navigation systems, if a user required current information relating to a place which they intended to visit the user could adopt any of a number of approaches. One approach would be to use an Internet-connected terminal to locate and print relevant information that could accompany the user on the user's journey. Another approach would be to find an information bureau upon reaching the destination and to request relevant information from the bureau. Yet a further approach would be to purchase a guide book prior to departure and to make use of the guide book once the destination had been reached.

The disadvantage with each of the above approaches is that all require a degree of planning and research by the user before the time of departure. This may be inconvenient and also may not be possible if the user has time constraints. There is also the possibility that the information obtained is not up to date and, accordingly, may not be useful. Also, the need to obtain the information before departing can make it difficult or at least inconvenient for a user to change plans once the trip is under way.

CO-PENDING APPLICATIONS

Various methods, systems and apparatus relating to the present invention are disclosed in the following co-pending applications filed by the applicant or assignee of the present invention simultaneously with the present application:

| | | |
|---|---|---|
| PCT/AU03/00154 | PCT/AU03/00151 | PCT/AU03/00150 |
| PCT/AU03/00145 | PCT/AU03/00153 | PCT/AU03/00152 |
| PCT/AU03/00168 | PCT/AU03/00169 | PCT/AU03/00170 |
| PCT/AU03/00162 | PCT/AU03/00146 | PCT/AU03/00159 |
| PCT/AU03/00171 | PCT/AU03/00149 | PCT/AU03/00167 |
| PCT/AU03/00158 | PCT/AU03/00147 | PCT/AU03/00166 |
| PCT/AU03/00164 | PCT/AU03/00163 | PCT/AU03/00165 |
| PCT/AU03/00160 | PCT/AU03/00157 | PCT/AU03/00148 |
| PCT/AU03/00156 | PCT/AU03/00155 | |

The disclosures of these co-pending applications are incorporated herein by cross-reference.

RELATED PATENT APPLICATIONS AND PATENTS

| | | | |
|---|---|---|---|
| U.S. Pat. No. 6,227,652 | U.S. Pat. No. 6,213,588 | U.S. Pat. No. 6,213,589 | U.S. Pat. No. 6,231,163 |
| U.S. Pat. No. 6,247,795 | U.S. Pat. No. 6,394,581 | U.S. Pat. No. 6,244,691 | U.S. Pat. No. 6,257,704 |
| U.S. Pat. No. 6,416,168 | U.S. Pat. No. 6,220,694 | U.S. Pat. No. 6,257,705 | U.S. Pat. No. 6,247,794 |
| U.S. Pat. No. 6,234,610 | U.S. Pat. No. 6,247,793 | U.S. Pat. No. 6,264,306 | U.S. Pat. No. 6,241,342 |
| U.S. Pat. No. 6,247,792 | U.S. Pat. No. 6,264,307 | U.S. Pat. No. 6,254,220 | U.S. Pat. No. 6,234,611 |
| U.S. Pat. No. 6,302,528 | U.S. Pat. No. 6,283,582 | U.S. Pat. No. 6,239,821 | U.S. Pat. No. 6,338,547 |
| U.S. Pat. No. 6,247,796 | U.S. Pat. No. 09/113,122 | U.S. Pat. No. 6,390,603 | U.S. Pat. No. 6,362,843 |
| U.S. Pat. No. 6,293,653 | U.S. Pat. No. 6,312,107 | U.S. Pat. No. 6,227,653 | U.S. Pat. No. 6,234,609 |
| U.S. Pat. No. 6,238,040 | U.S. Pat. No. 6,188,415 | U.S. Pat. No. 6,227,654 | U.S. Pat. No. 6,209,989 |
| U.S. Pat. No. 6,247,791 | U.S. Pat. No. 6,336,710 | U.S. Pat. No. 6,217,153 | U.S. Pat. No. 6,416,167 |
| U.S. Pat. No. 6,243,113 | U.S. Pat. No. 6,283,581 | U.S. Pat. No. 6,247,790 | U.S. Pat. No. 6,260,953 |
| U.S. Pat. No. 6,267,469 | U.S. Pat. No. 6,273,544 | U.S. Pat. No. 6,309,048 | U.S. Pat. No. 6,420,196 |
| U.S. Pat. No. 6,443,558 | U.S. Pat. No. 09/422,892 | U.S. Pat. No. 6,378,989 | U.S. Pat. No. 09/425,420 |
| U.S. Pat. No. 09/422,893 | U.S. Pat. No. 09/609,140 | U.S. Pat. No. 6,409,323 | U.S. Pat. No. 6,281,912 |
| U.S. Pat. No. 09/575,113 | U.S. Pat. No. 6,318,920 | U.S. Pat. No. 6,488,422 | U.S. Pat. No. 09/693,644 |
| U.S. Pat. No. 6,457,810 | U.S. Pat. No. 6,485,135 | U.S. Pat. No. 09/112,763 | U.S. Pat. No. 6,331,946 |
| U.S. Pat. No. 6,246,970 | U.S. Pat. No. 6,442,525 | U.S. Pat. No. 09/505,951 | U.S. Pat. No. 09/505,147 |
| U.S. Pat. No. 09/505,952 | U.S. Pat. No. 09/575,108 | U.S. Pat. No. 09/575,109 | U.S. Pat. No. 09/575,110 |
| U.S. Pat. No. 09/607,985 | U.S. Pat. No. 6,398,332 | U.S. Pat. No. 6,394,573 | U.S. Pat. No. 09/606,999 |
| U.S. Pat. No. 6,238,044 | U.S. Pat. No. 6,425,661 | U.S. Pat. No. 6,390,605 | U.S. Pat. No. 6,322,195 |
| U.S. Pat. No. 09/504,221 | U.S. Pat. No. 6,480,089 | U.S. Pat. No. 6,460,778 | U.S. Pat. No. 6,305,788 |
| U.S. Pat. No. 6,426,014 | U.S. Pat. No. 6,364,453 | U.S. Pat. No. 6,457,795 | U.S. Pat. No. 09/556,219 |
| U.S. Pat. No. 09/556,218 | U.S. Pat. No. 6,315,399 | U.S. Pat. No. 6,338,548 | U.S. Pat. No. 09/575,190 |
| U.S. Pat. No. 6,328,431 | U.S. Pat. No. 6,328,425 | U.S. Pat. No. 09/575,127 | U.S. Pat. No. 6,383,833 |
| U.S. Pat. No. 6,464,332 | U.S. Pat. No. 6,390,591 | U.S. Pat. No. 09/575,152 | U.S. Pat. No. 6,328,417 |
| U.S. Pat. No. 6,322,194 | U.S. Pat. No. 09/575,177 | U.S. Pat. No. 09/575,175 | U.S. Pat. No. 6,417,757 |
| U.S. Pat. No. 09/608,780 | U.S. Pat. No. 6,428,139 | U.S. Pat. No. 09/607,498 | U.S. Pat. No. 09/693,079 |
| U.S. Pat. No. 09/693,135 | U.S. Pat. No. 6,428,142 | U.S. Pat. No. 09/692,813 | U.S. Pat. No. 09/693,319 |
| U.S. Pat. No. 09/693,311 | U.S. Pat. No. 6,439,908 | U.S. Pat. No. 09/693,735 | PCT/AU98/00550 |
| PCT/AU00/00516 | PCT/AU00/00517 | PCT/AU00/00511 | PCT/AU00/00754 |
| PCT/AU00/00755 | PCT/AU00/00756 | PCT/AU00/00757 | PCT/AU00/00095 |
| PCT/AU00/00172 | PCT/AU00/00338 | PCT/AU00/00339 | PCT/AU00/00340 |
| PCT/AU00/00341 | PCT/AU00/00581 | PCT/AU00/00580 | PCT/AU00/00582 |
| PCT/AU00/00587 | PCT/AU00/00588 | PCT/AU00/00589 | PCT/AU00/00583 |

-continued

| RELATED PATENT APPLICATIONS AND PATENTS | | | |
|---|---|---|---|
| PCT/AU00/00593 | PCT/AU00/00590 | PCT/AU00/00591 | PCT/AU00/00592 |
| PCT/AU00/00584 | PCT/AU00/00585 | PCT/AU00/00586 | PCT/AU00/00749 |
| PCT/AU00/00750 | PCT/AU00/00751 | PCT/AU00/00752 | PCT/AU01/01332 |
| PCT/AU01/01318 | PCT/AU00/01513 | PCT/AU00/01514 | PCT/AU00/01515 |
| PCT/AU00/01516 | PCT/AU00/01517 | PCT/AU00/01512 | PCT/AU01/00502 |
| PCT/AU02/01120 | PCT/AU00/00333 | PCT/AU01/00141 | PCT/AU01/00139 |
| PCT/AU01/00140 | PCT/AU00/00753 | PCT/AU01/01321 | PCT/AU01/01322 |
| PCT/AU01/01323 | PCT/AU00/00594 | PCT/AU00/00595 | PCT/AU00/00596 |
| PCT/AU00/00597 | PCT/AU00/00598 | PCT/AU00/00741 | PCT/AU00/00742 |

SUMMARY OF THE INVENTION

In according with a first aspect of the invention, there is provided an information retrieval system for retrieving information relating to a locality, the system being associated with a device and including:
  a data collecting means for collecting data relating to a location of the device and the locality in which the device is located;
  a processing means, in communication with said data collecting means, for processing said collected data to provide formatted data suitable for printing; and
  a printing unit, associated with said conveyance, for printing said formatted data to provide information relating to said locality.

Preferably, the device is a conveyance and the printing unit is installed in the conveyance.

In accordance with a second aspect of the invention, there is provided a method of retrieving information relating to a locality in which a device is located, the method including the steps of:
  collecting data relating to a location of the device and the locality in which the device is located;
  processing said collected data to provide formatted data suitable for printing; and
  printing said formatted data when required by a user to provide the user with information relating to said locality.

In accordance with a third aspect of the invention, there is provided an information retrieval system for retrieving information relating to a locality, the system being installed in a vehicle and the system including:
  an onboard data collecting means for collecting data relating to the location of the vehicle in the locality and data relating to the locality;
  a processing means, in communication with the data collecting means, for processing said collected data to provide formatted data which is in a suitable format for printing; and
  an onboard printing unit for printing said formatted data, on demand, to provide information relating to the locality.

In accordance with a fourth aspect of the present invention, there is provided a method of retrieving information relating to a locality from a vehicle located in the locality, the method including the steps of:
  from on board the vehicle, collecting data relating to the location of the vehicle in the locality and data relating to the locality;
  processing said collected data to provide formatted data which is in a suitable format for printing; and
  printing said formatted data on an onboard printer to provide information relating to the locality.

In accordance with a fifth aspect of the invention, there is provided an information retrieval system for retrieving information relating to a locality, the system being installed in a vehicle and the system including:
  a position sensing means carried by the vehicle for sensing the position of the vehicle in the locality and to provide location data;
  an onboard accessing means, in communication with the position sensing means, for accessing a database containing locality data relating to a map of the locality and features of the locality;
  a layout engine responsive to the accessing means for processing the locality data into data elements;
  a pre-printing processing means which is connected to the layout engine and which processes the data elements to provide formatted data which is in a format which is suitable for printing; and
  an onboard printer for printing the formatted data, on demand, to provide a hard copy of the information relating to the locality.

In accordance with a sixth aspect of the invention, there is provided a method of retrieving information relating to a locality, from a vehicle located in the locality, the method including the steps of:
  sensing the position of the vehicle in the locality and providing location data;
  from on board the vehicle, accessing a database containing locality data relating to a map of the locality and features of the locality;
  processing the locality data into data elements;
  further processing the data to provide formatted data which is in a format which is suitable for printing; and
  printing, on an onboard printer, the formatted data, on demand, to provide a hard copy of the information relating to the locality.

Preferably, the location is determined using a global positioning system (GPS) receiver.

BRIEF DESCRIPTION OF THE DRAWINGS

A preferred embodiment of the invention will now described, by way of example only, with reference to the accompanying drawings, in which.

DETAILED DESCRIPTION OF THE PREFERRED EMBODIMENT

Figure 1:
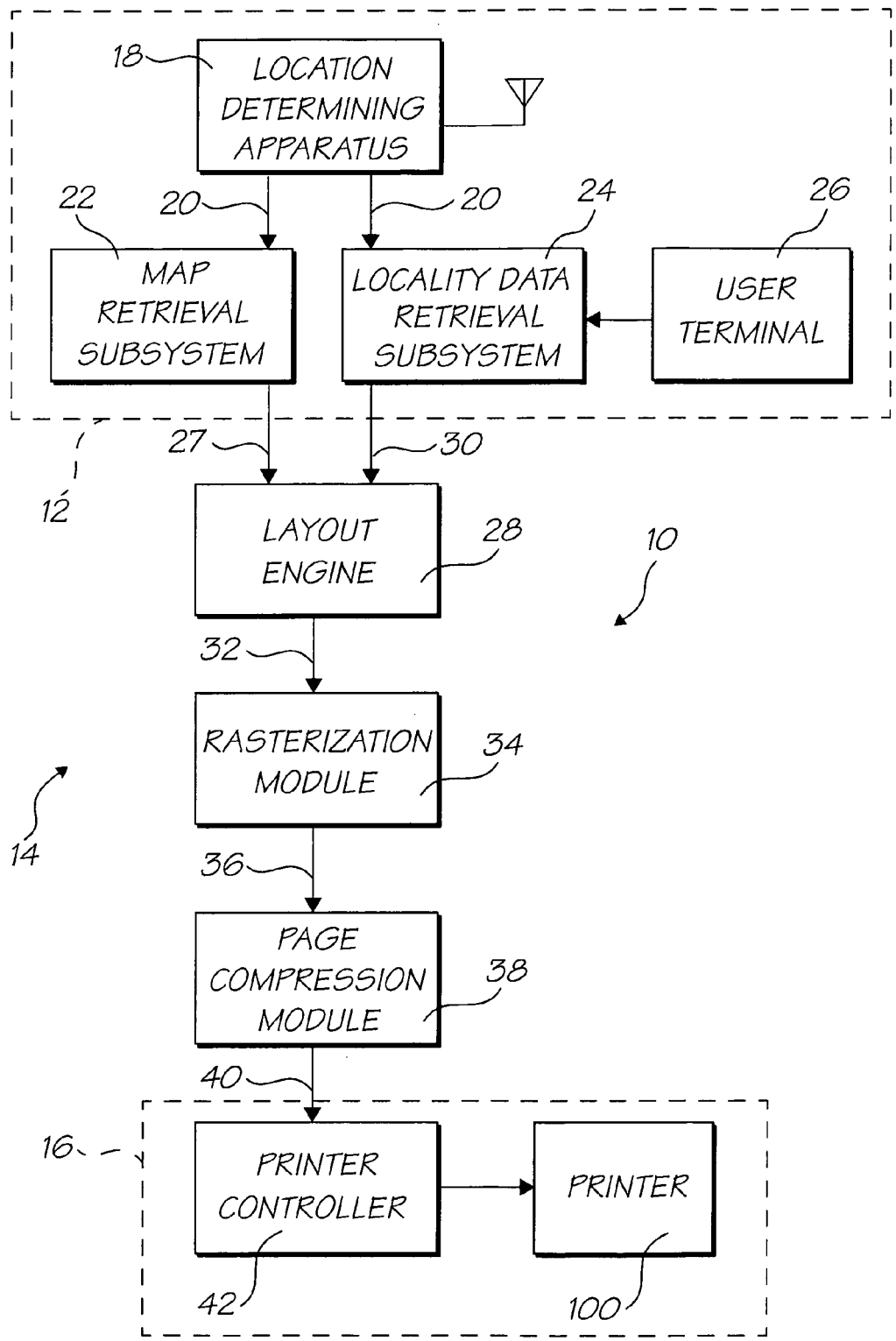
FIG. 1 shows a block diagram of an information retrieval system, in accordance with the invention, for retrieving information relating to a locality, the information retrieval system being in accordance with the invention.
Figure 2:
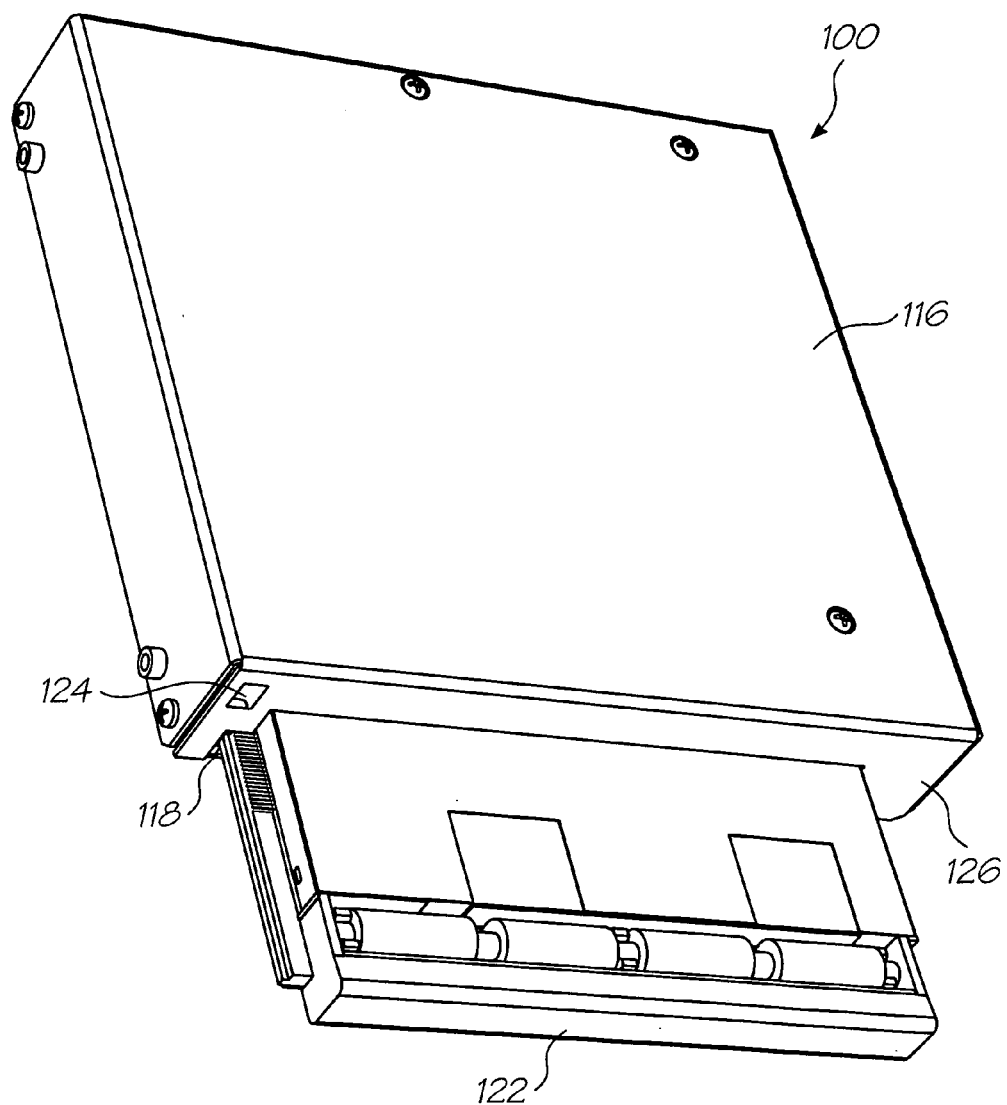
FIG. 2 shows a three dimensional view of a printer for use with the system.

In the drawings, reference numeral 10 generally designates an information retrieval system, in accordance with the invention, for retrieving information relating to a locality. The system 10 is installed in a conveyance, such as a motor vehicle.

The system 10 includes a data collecting means 12 for collecting data relating to a location of the motor vehicle and the locality in which the motor vehicle is positioned. A processing means 14 is connected to the data collecting means 12. A printing unit 16 receives formatted data from the processing means 14.

The data collecting means includes a location determining unit 18. In one embodiment, shown in FIG. 15, the location determining unit provides the location of the motor vehicle as a set of co-ordinates. In the preferred form, the location determining unit is a global positioning system (GPS) receiver 18. The receiver 18 provides the co-ordinates in the form of location data on output lines 20 to a locality depicting sub-system in the form of a map retrieval sub-system 22 and a locality data retrieval sub-system 24.

As will be described in greater detail below, the sub-system 24 can be interrogated by a user terminal 26 so that data output from the sub-system 24 can be filtered to meet the user's requirements.

Map data from the map retrieval sub-system 22 is output on a line 26 to a layout engine 28 of the processing means 14. Similarly, data from the locality data retrieval sub-system 24 is output on a line 30 to the layout engine 28.

The information supplied to the layout engine 28 can optionally contain layout information (the layout information ultimately used may be default layout information known to the layout engine 28) but is likely to be organised into a number of tagged elements that correspond to data to be arranged in some fashion on the output medium, which can be a sheet of paper. The layout engine 28 performs the layout of both graphical and textual data elements provided as part of both the locality data and map data. This includes potentially overlaying features of interest from the locality data on line 30 onto a graphical representation of a map output as map data on line 26. The output from the layout engine 28 is a complete description of one or more pages and is transmitted as a page description. The page description is in the form of a page description language such as Postscript or PDF.

The page description is output on line 32 to a rasterization module 34. An output from the rasterization module 34, in the form of a rasterized page, is transmitted on line 36 to a page compression module 38.

An output from the page compression module 38 is transmitted as a compressed page on line 40 to a printer controller 42 of the printing unit 16. The printer controller 42 controls a printer 100.

Each of the components of the system 10 is now described in greater detail.

Figure 15:
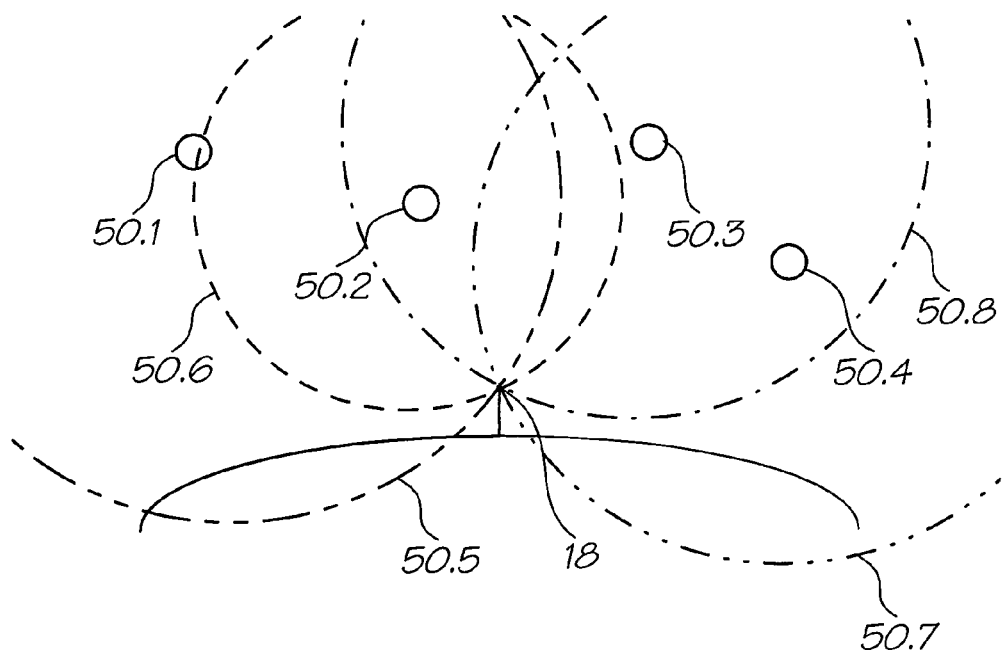
FIG. 15 shows a schematic diagram of one embodiment of a position sensing system for use with the information retrieval system of FIG. 1.

In the first embodiment of the receiver 18, use is made of the global positioning system (GPS). The GPS consists of 24 satellites orbiting the earth in a fixed pattern such that from any point within range of the GPS, at least four satellites are visible. It is this line-of-sight to at least four satellites that enables the determination of a number of parameters relating to the location of the GPS receiver 18. In FIG. 15 of the drawings, four satellites 50.1-50.4 and their associated transmission foot prints 50.5 to 50.8, respectively, are shown in a two dimensional projection.

Those skilled in the art will understand that each of the satellites 50.1-50.4 contains a high accuracy atomic clock and also ephemeris data. The ephemeris data and the current time are transmitted by each satellite 50.1-50.4 at fixed intervals so that they may be received by the GPS receiver 18. By comparing the time at the GPS receiver 18 with the time received by way of the satellite transmissions, it is possible to calculate the distance between the receiver 18 and each of the satellites 50.1-50.4. With the addition of the ephemeris data, the position of the satellites 50.1-50.4 are also available. Given these two pieces of information, it is possible to narrow down the position of the receiver 18 to a point on a sphere centred on the satellites 50.1-50.4. With four sets of data from the four satellites 50.1-50.4, the intersections of each of these spheres 50.5-50.8 yields X, Y and Z co-ordinates of the GPS receiver 18 and also an accurate measure of UTC time. A transformation of these co-ordinates yields the receiver's position in terms of latitude, longitude and height above sea level.

To overcome the uncertainty of the GPS created by the introduction of "selective availability" into the GPS by the US military, an enhanced GPS, known as dGPS or differential GPS can be used. This uses a differential signal where it is available. dGPS uses a fixed reference base station equipped with a GPS receiver in addition to a portable receiver. The fixed receiver transmits a signal representing the error in the GPS signal that it receives to the portable receiver. The portable receiver then uses this signal to reduce the error in its position estimation.

Figure 16:
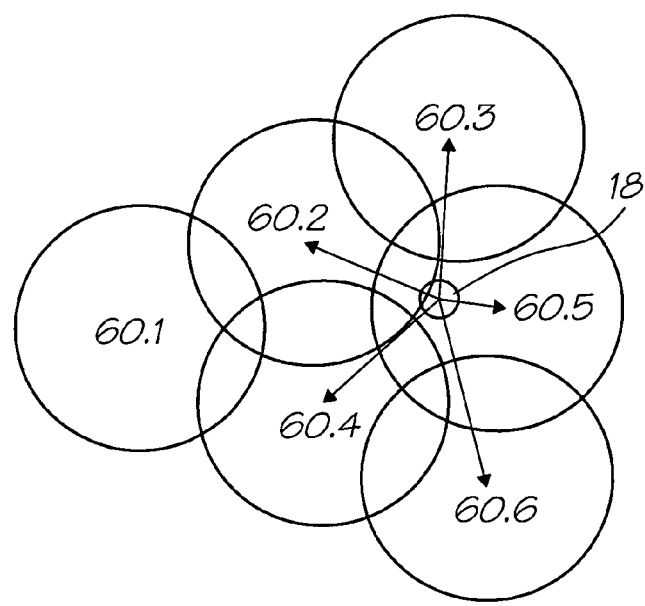
FIG. 16 shows a schematic diagram of another embodiment of a position sensing system for use with the information retrieval system of FIG. 1.

In another embodiment of the invention, instead of using the GPS or in addition to it, a mobile phone network can be used as shown in FIG. 16. It is only possible to use this network in populated areas in which a number of mobile phone base stations are located such as within the boundaries of a city.

A typical mobile telephone network consists of a number of base stations 60.1-60.6 (FIG. 16). Each base station 60.1-60.6 transmits in a predetermined area or foot print to define a cell. The distance between adjacent base stations is usually arranged so that the size of each cell is large enough to provide a degree of overlap between it and its neighboring cells. This allows a user to roam over the coverage area whilst still having access to telephone services since they are always in the area of at least one cell.

As a user moves within a cell, the strength of the signal that it receives from that cell varies depending on a number of factors including the distance from a base station 60.1-60.6. As a user moves between cells, the handset typically switches from using the base station corresponding to the cell with a lower signal strength to a base station corresponding to a cell with a higher signal strength in order to maintain service quality.

Given the distribution of cells and the ability of a handset to emit a signal that may be received by more than one base station as it propagates, a traffic controlling mechanism is provided in which the location of a handset may be determined to within a certain degree of accuracy, possibly an accuracy of about ten meters.

A number of different techniques may be employed to locate the handset functioning as a receiver 18. The selected technique depends mainly on the type of technology of the handset and its network. Generally, differences between the time of arrival of access bursts generated by the handset 18 can be used to triangulate the position of the receiver 18 by calculating the distance from three base stations to the receiver 18. The reverse of this technique, whereby the receiver 18 determines its location based on access bursts generated by nearby base stations, can also be used by incorporating specialised location determining functionality into the receiver 18.

It will be appreciated that a combination of mobile telephone networks and the GPS can be used yielding a system called Assistance-GPS.

The map retrieval sub-system 22 comprises a combination of a map data server and a corresponding access mechanism. The embodiment of the access mechanism depends on the location of the map data server.

Maps may be stored in a number of ways directly relating to how they are eventually to be used. For instance, for a GPS system displaying map data, maps may be stored as a set of polygons with co-ordinates corresponding to GPS map references. Another option is to store images of map components (such as street intersections, that may be connected together to create a map image). Yet a further option may be to store complete map images in a compressed format.

Depending on the specific application, a map server may be small enough to embed in a device, fit conveniently in a trunk of the motor vehicle or be accessed from a remote location.

A portable, embedded embodiment of a map server typically contains a low-resolution representation of map data. For example, the default map data may only be available at a fixed scale showing major map details with other more detailed maps possibly being available for installation on a needs basis. These servers commonly accept exchangeable flash memory in which various sets of map data may be stored. A slightly largely map server may contain a CD-ROM or DVD drive that accepts media containing detailed maps covering a large area that may be accessed on demand. A user of such assistance inserts the CD or DVD containing maps covering the required region before undertaking a journey.

Large centralised map servers may serve maps with extremely high levels of detail and are not generally portable. Servers of this type are accessed remotely over a network mechanism and may be geographically distributed corresponding to the area of the world which they are serving. These servers may distribute maps by way of HTTP or some other protocol and may incorporate a caching front end such that the most frequently requested map portions are available with little delay.

The locality data retrieval sub-system 24 comprises a combination of a locality data server and a corresponding access mechanism (the user terminal 26). Once again, the type of access mechanism used will depend on the locality data server.

A locality data server is similar to a combination of the services that a tourist bureau, local newspaper and current events hotline may provide. The server maintains a database of a variety of up-to-date information from a large variety of sources that may be of interest to a target user of the system 10. Information stored on the locality server is retrieved according to a number of categories including the time of day at which the request is made, the specific location of a user (including indications of their potential immediate destinations), the task that a user is involved in (as a tourist the goals of a user would be vastly different from a shopper) and general information about the user that may be provided by the user using the user terminal 26.

Based on information supplied by the user via the user terminal 26, locality information is supplied that is comprised of a number of elements that can be printed or of some other nature. This includes images, text and potentially layout information that may be used or ignored by the user.

Some examples of the types of information that may be supplied by a locality information server are attractions within an area such as cites of interest; monuments, etc; events such as concerts or performances; venues in the area such as restaurants and cinemas; shopping areas; weather; and local news. The server may be a shared resource which is accessible by way of a network. In this way, the server can be updated regularly to provide information that is up-to-date and relevant.

A portable version of a locality data server is also possible such as by way of a subscription service in which media containing locality information is delivered to a user on a regular basis. This media may then be used with a corresponding reader and access mechanism to retrieve information that is relevant to the user's current requirements.

The layout engine 28 may be required to manipulate data sourced from a plurality of sources. This data may have no embedded layout information. Depending on the kind of content supplied, it may be necessary to firstly create a formatted description of the content which can then be used to generate one or more pages of page description language.

The page description language to be generated by the layout engine 28 determines the kinds of data elements, and the structuring of elements that may be used to compose a page. For example, if the page description language used is Postscript, then the elements that are used to describe the page include filled and stroked paths consisting of line segments and curves, text with corresponding font definitions, and images.

A template for laying out data may be dynamically generated by the layout engine 28 based on user choices, may be a static built-in template, or may even be obtained from some other source such as the source suppling the data.

A number of possibilities exist for layout and content descriptions that can be used to generate a set of consistent layouts for a page containing a number of elements which may be both textual and graphical.

One example of a method of data layout that allows data to be sourced from a plurality of separate locations is through using a combination of XML (eXtensible Markup Language) and XSL (extensible Stylesheet Language). XML allows content to be marked up by applying a set of tags to the content The definition of each tag in particular XML content is described in a separate scheme referenced by the XML. XSL provides a method of transforming XML into another format (for example HTML) whilst simultaneously performing selection and filtering operations.

The combination of XML content and XSL as a layout specification allows for descriptions of one or more pages to be produced in a formatting language. The formatting language may then be translated into a page description language suitable for printing (ie, one that provides descriptions of objects, their locations and compositing details).

Another possible layout and content description which can be used is a document which is specified in HTUL (Hyper Text Markup Language) which is supplied to the layout engine 28 for the purposes of creating a page description. One or more stylesheets specified according to CSS (Cascading Style Sheet) standard may also be supplied, allowing the layout engine 28 to associate a supplied style with a set of tags. If no style sheet is supplied a set of default styles internal to the layout engine 28 is adopted.

The HTML document is then translated into a page description language suitable for printing.

The rasterization module 34 is provided to convert data from page description language into a format that can be sent to the print engine of the printer 100. This format may take a number of forms depending on the characteristics of the print engine such as the color gamut of the output device, the types of markers to be used, the number of markers being used (and their respective colors) and the medium being marked.

The page description received by the rasterization module 34 may also take a number of forms. Many page description languages are program oriented in that a page is described in a pragmatically generated manner. Other page description languages describe pages in terms of a set of objects placed on a page by way of a painter's algorithms. Still other page description languages describe a page in terms of a compositing model that defines a hierarchy of objects located on a page, each with a defined compositing order relative to a neighborhood of other objects.

A number of ways exist in which rasterization of a page, a set of pages, a sub-set of objects on a page or a sub set of objects on a number of pages may be processed by the rasterization module 34.

One method of rasterization involves a divide-and-conquer approach in which the page description language is initially interpreted to form a model of the page. The page is scanned and objects are rasterized as they are encountered and then composited to form pixmap output for a portion of the page. The pixmap is then mapped into the color space of the output device or dithered (or error defused) to match the characteristics required by the output device.

Another method of rasterization which may be employed by the rasterization module 34 is to render each object in full or partially according to the type of object, the coverage of the object with respect to the page (and the portion of the page currently being rendered) and caching aspects of the object For instance, if a character string is to be rasterized, each character in the string may be rasterized in full and then cached for later reuse whereas a filled rectangle may only be rasterized as necessary.

Depending on the output requirements for the rasterization module 34, each page to be rasterized may be generated in its entirety or generated in a band wise fashion for forwarding to the page compression module 38. In this way, if a page is larger than a certain size, and memory needs to be conserved, a page may be divided into a number of bands that may be rasterized on demand.

The page compression module 38 is provided to reduce the amount of rasterized page data that needs to be transferred to the printer controller 42. The page data is compressed using one or more of a number of techniques that do not result in a visible degradation in the quality of the final printed image.

A method of compressing contone data is JPEG compression. With this compression technique, contone pixels are converted into a luminance/chrominance representation which may then efficiently be compressed by using quantization of a discrete cosine transformation of the data. This quantized version of the data is entropy coded to reduce large runs of zero valued elements, typically resulting in an overall 10:1 reduction in data size with virtually no resulting significant loss of image quality.

The wavelet transform, as adopted by the JPEG 2000 standard, is a method used to compress contone data. Two different wavelet transforms are specified by JPEG 2000, namely, a 9/7 wavelet transform for loss compression and a 5/3 3 wavelet transform for lossless compression. Given that the results of compression using the 9/7 wavelet transform are visually superior to the results of compression using the discrete cosine transform, it is reasonable to expect that a compression ratio of at least 50:1 can be achieved without significant degradation of the reconstructed image.

The scan order adopted by JPEG 2000 is a spiral scan of the original image, traversed one pixel at a time. This is not convenient for printing applications since it would require that the complete page be decoded and stored or that the page be decoded multiple times for printing to be carried out. To remedy this, it may be possible to adopt an alternative scan order that traverses each image row in sequence such that each portion of the image received can be immediately decoded and printed independently of the receipt of the complete compressed page.

Compression of bilevel images may be performed by using the commonly known Group 3 or Group 4 fax algorithms. These algorithms exploit the two dimensional properties of typical bilevel images to achieve an average 30:1 compression.

The JBIG (Joint Bilevel Image Group) has defined a method for the compression of bilevel images called JBIG2 that is able to yield higher compression ratios than the older Group 3 and Group 4 fax algorithms with a more complex encoder/decoder combination. Essentially JBIG2 relies on the encoder to successfully segment an input image into a number of regions that are compressed with techniques specialised according to the properties of the region being encoded. Regions that contain text elements are encoded using an algorithm that stores encoded versions of bitmaps corresponding to each character. Regions that contain half toned images (particularly for the case when ordered half toning has been used) are encoded by storing a dictionary of half toned patterns and the regions to which they apply. Regions that contain other elements such as line art are encoded into a compressed bitmap representation.

In certain instances, page compression may not be required. In that case, the page compression module 38 functions using null compression wherein the page is not compressed at all and the page compression module 38 functions as a pass-through module.

The printer controller 42 is responsible for handling the hardware specific aspects of the printing process. This enables a number of different types of printing mechanisms or printers 100 to be adopted without changing details of the system further up the chain of print modules.

The printer controller 42 receives a rasterized version of each page which is usually compressed using one of the compression techniques described above. The page may be received in its entirety or in a bandwise fashion depending on the size of the page and the functioning of the preceding modules 34 and 38.

In the printer controller 42, the page data are progressively accessed in printer order, decompressed if required and organised into a format suitable for hardware of the printer 100 to enable the hardware of the printer 100 to program its printhead 300. This recognition may include such factors as may be necessary to account for special characteristics of a particular printhead 300 such as up scaling and dithering of the print data and adjustments, if necessary, for the markers and paper being used.

Referring to FIGS. 2 to 7 of the drawings, the printer 100 is described in greater detail.

The printer 100 includes a chassis 112 (FIG. 3) which is covered by a top cover 116 that includes an access opening 118. The access opening 118 is closed off by a flap 120. The flap 120 is spring biased so that, when a cartridge 122 has been removed from the printer 100, the flap is urged upwards to close off the access opening 118.

The device which sends commands to the printer 100 can either be hard wired to the printer 100, for example, via a wiring loom of the motor vehicle, or may send commands to the printer 100 in a wireless manner. For this purpose, the printer 100 includes a port 124 able to detect wireless communications, such as infra-red or radio frequency communications.

Figure 3:
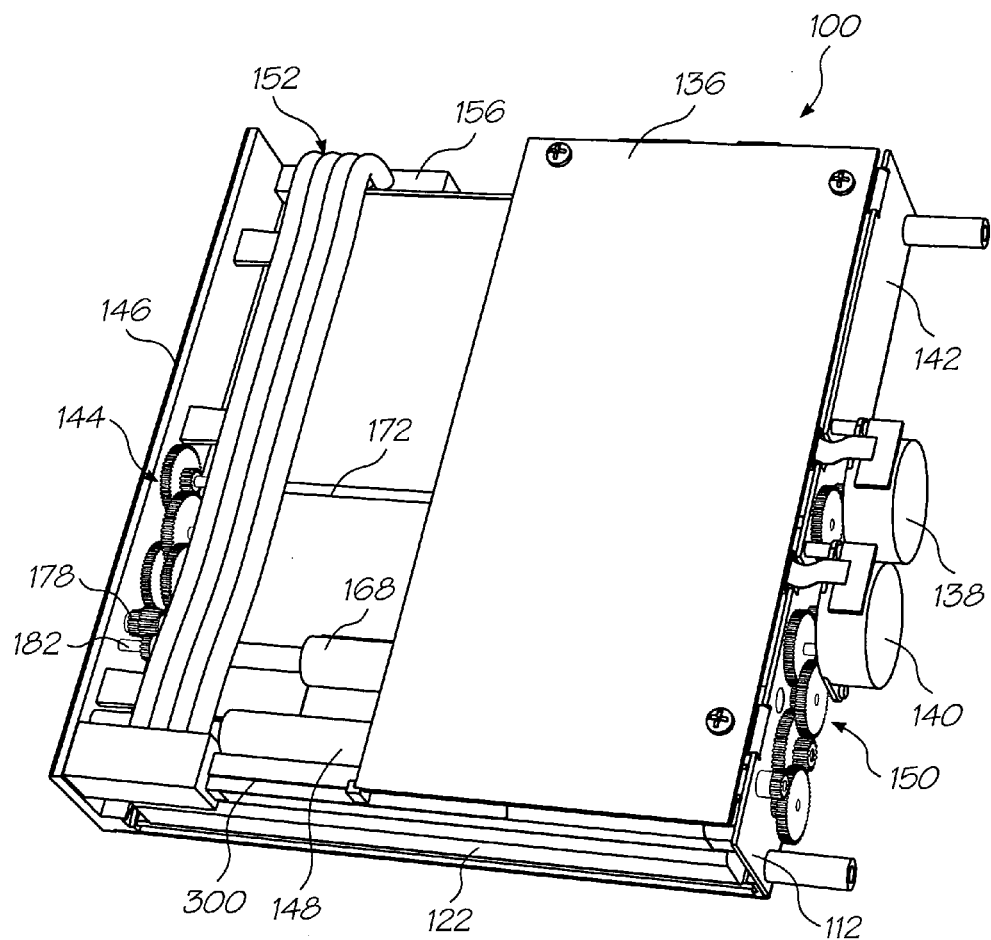
FIG. 3 shows a three dimensional view of the printer with a cover removed.

The printer 100 incorporates a printhead 300 (FIG. 3). The printhead 300 is a pagewidth ink jet printhead. More particularly, the printhead 300 is a four color printhead, or three color plus infra red ink, printhead capable of printing photo quality prints on print media stored in the cartridge 122. The printhead 300 comprises an array of nozzles to provide printing at 1600 dpi. The nozzles of the printhead 300 are manufactured using the applicant's Memjet technology. The printhead is described in greater detail below.

The printhead 300 receives commands from a printed circuit board (PCB) 136 secured to the chassis 112.

A pair of drive motors 138 and 140 are mounted on a sidewall 142 of the chassis 112. The drive motor 138, which is in the form of a stepper motor, drives a first drive arrangement in the form of a first gear train 144. The first gear train 144 is mounted on a side molding 146 of the chassis 112.

The drive motor 140, which is also in the form of a stepper motor, drives a drive roller 148 via a second drive arrangement in the form of a second gear train 150.

The printhead 300 receives ink from ink hoses 152 which communicate with an ink supply reservoir 154 (FIG. 7) of the cartridge 122 via an ink supply manifold 156, as will be described in greater detail below.

Figure 4:
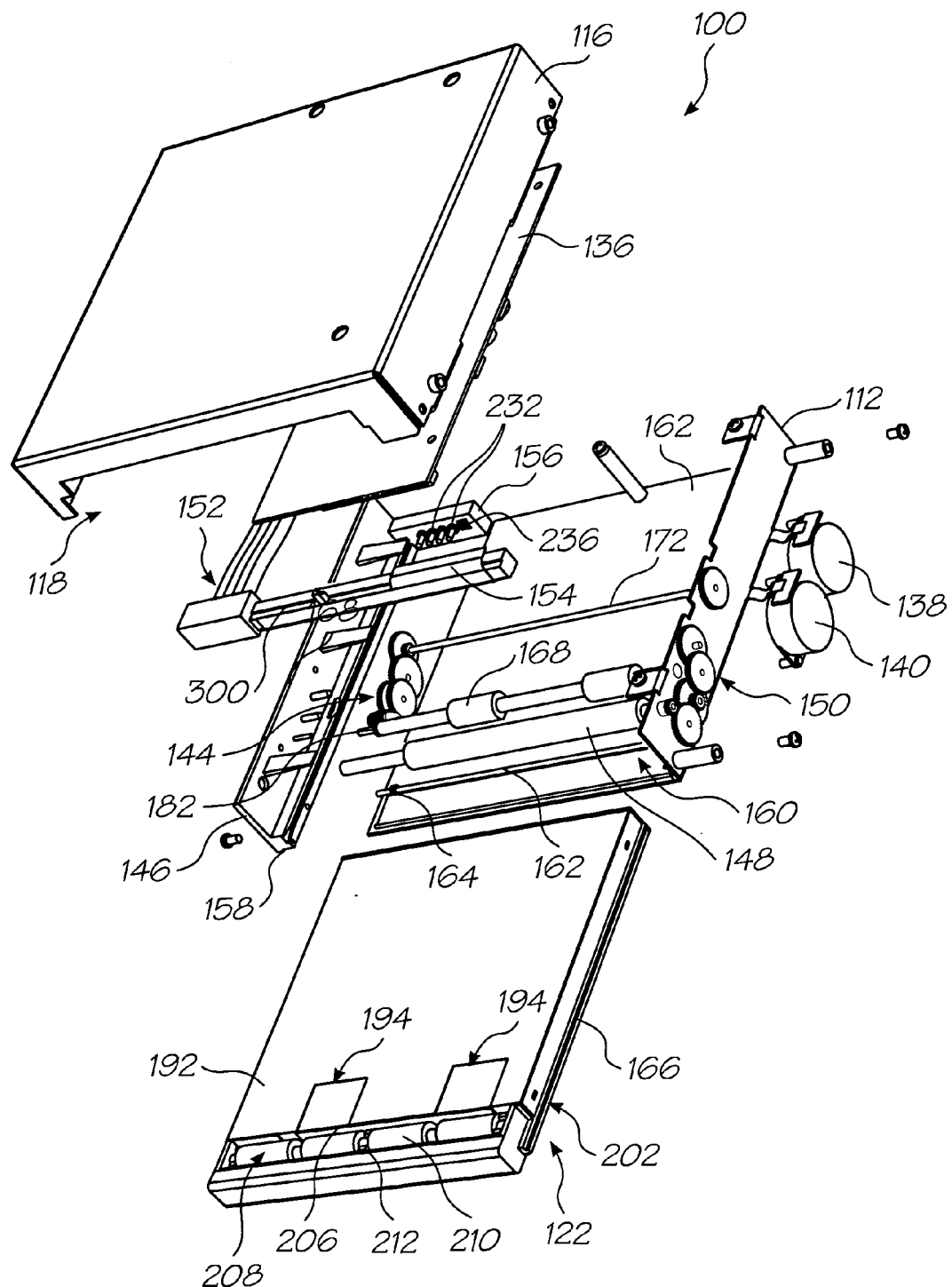
FIG. 4 shows a three dimensional, exploded view of the printer.
Figure 5:
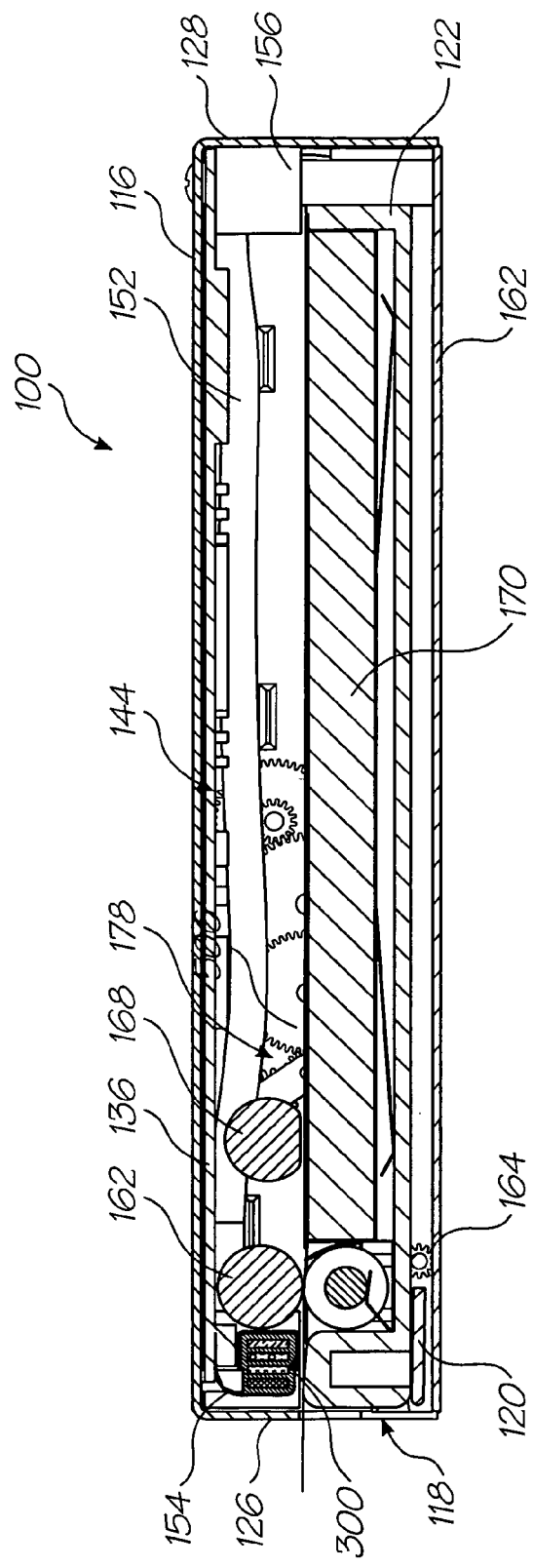
FIG. 5 shows a sectional side view of the printer.

Referring to FIG. 4 of the drawings, an exploded view of the printer 100 is illustrated. It is to be noted that the printhead 300 communicates with the PCB 136 via a TAB film 154.

A slot 158 is defined in the side molding 146. The slot 158 receives a corresponding formation of the cartridge 122 in it. Further, a roller set 160 is mounted on a base 162 of the printer 100. The roller set 160 comprises a rotatable axle 162. A cog 164 is mounted proximate each end of the axle 162. Each cog 164 engages a longitudinally extending rack 200, 202, one on each side of the cartridge 122, for inhibiting skewing of the cartridge 122 as it is inserted into, or withdrawn from, the printer 100.

The first gear train 144 engages a pick up roller 168 of the printer 100. The pick up roller 168 picks up print media in the form of a sheet of paper from a stack 170 of paper (FIG. 5) in the cartridge 122 for feeding to the printhead 300 of the printer 100 when printing is to be effected.

As shown in greater detail in FIG. 4 of the drawings, the first gear train 144 is powered by the stepper motor 138 via an axle 172 extending across the printer 100 to convey power from the stepper motor 138 to the first gear train 144. A gear 174 is mounted against the molding 146 at one end of the axle 172. The gear 174 drives a reduction gear set 176. Further, the reduction gear set 176 communicates with a reversing mechanism 178. Accordingly, the gear train 144 performs two functions. When the reversing mechanism 178 is not selected, the gear train 144 engages an upper rack 180 on the cartridge 122 for feeding the cartridge 122 into the printer 100 or ejecting the cartridge 122 from the printer 100. Instead, when the reversing mechanism has been selected, it engages the pick up roller 168 or, more particularly, a gear 182 mounted at an end of the pick up roller 168. The gear train 144 then serves to feed the paper to the drive roller 148 for conveying to the printhead 300.

Figure 6:
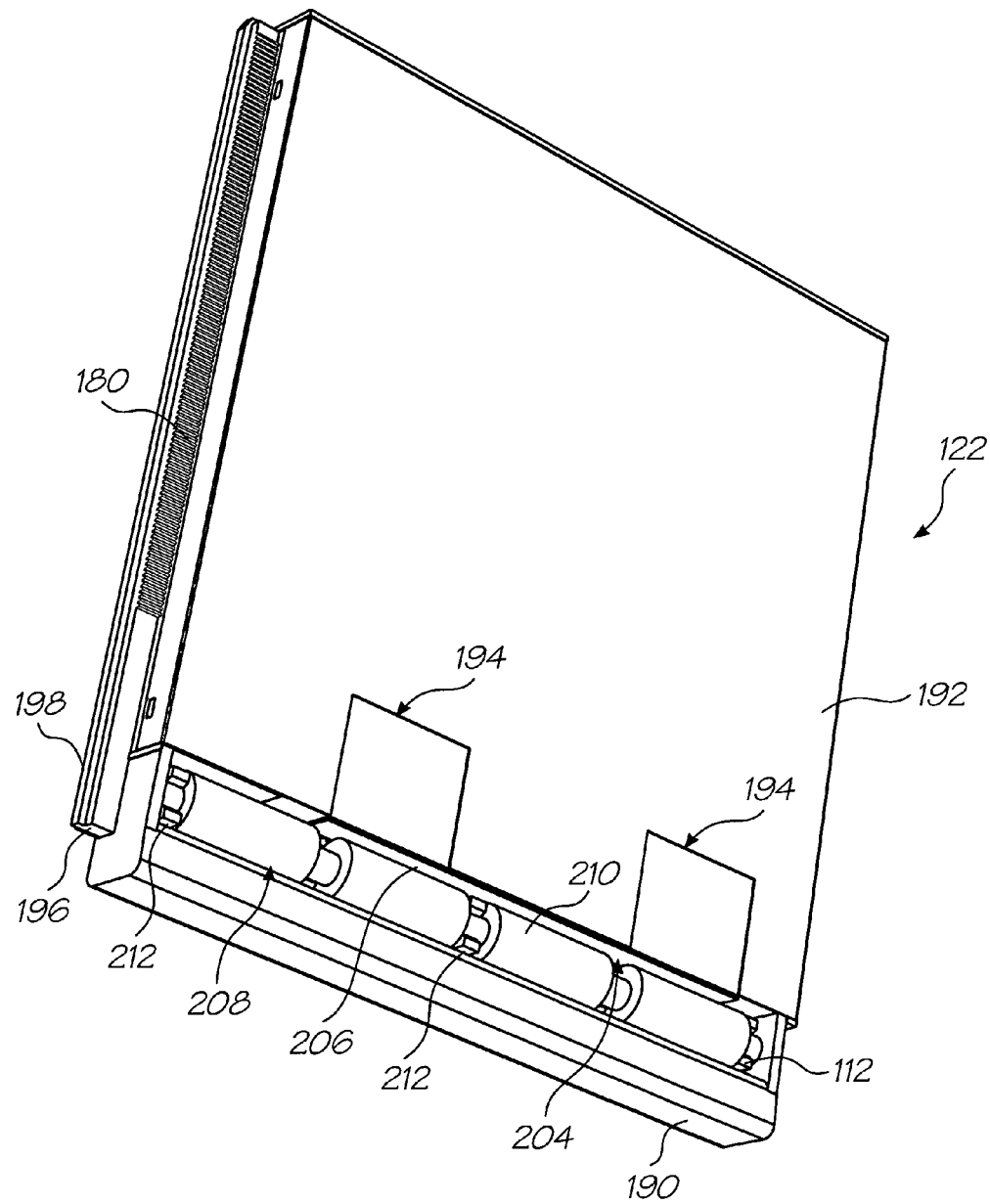
FIG. 6 shows a three dimensional view of a cartridge for the printer.
Figure 7:
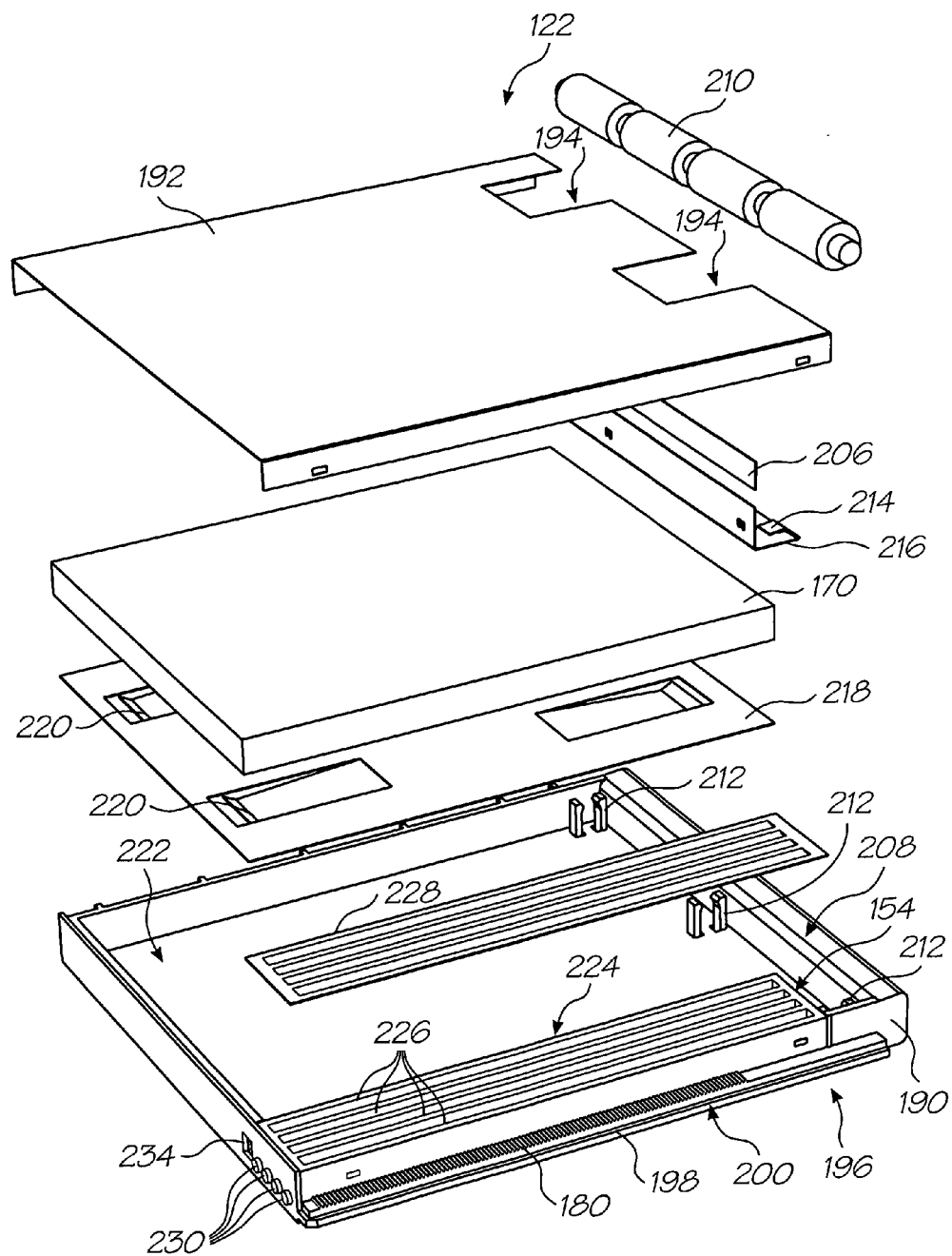
FIG. 7 shows a three dimensional, exploded view of the cartridge.

Referring now to FIGS. 6 and 7 of the drawings, the cartridge 122 is described in greater detail.

The cartridge 122 comprises a base molding 190. The base molding 190 is closed off by a metal cover 192. The cover 192 has a pair of transversely spaced openings 194 defined in a front edge thereof. These openings 194 permit the pick up roller 168 of the printer 100 to engage a topmost sheet of the stack 170 of paper within the cartridge 122.

A toothed rack 196 is provided on one side of the cartridge 122. The toothed rack 196 defines the upper rack 180 which is engaged by a gear of the first gear train 144 for insertion of the cartridge 122 into, or its ejection from, the printer 100. A rib 198 extends longitudinally along the side of the toothed rack 196. The rib 198 is received in the slot 158 in the side molding 146 of the printer 100. A lower surface of the toothed rack 196 also has one of the longitudinally extending racks 200 (FIG. 7) for engagement with one of the cogs 164. An opposed side of the base molding 190 of the cartridge 122 carries the other of the longitudinally extending racks 202 which engages the other cog 164 for inhibiting skewing of the cartridge 122 when it is inserted into, or ejected from, the printer 100.

A feed slot 204 is defined at a front edge of the metal cover through which a sheet of paper to be printed is passed in use. The feed slot 204 is partially defined by a plastics strip 206 which inhibits more than one sheet of paper being fed to the printhead 300 at any one time.

A transversely extending trough 208 is defined outwardly of the strip 206. The trough 208 accommodates a sprung roller 210 therein. The roller 210 is supported in the trough 208 via a plurality of clips 212.

The roller 210 is biased upwardly relative to a base of the trough 208 via leaf springs 214. The leaf springs 214 are formed integrally with an L-shaped metal bracket 216 which partially defines the trough 208. The roller 210 is a snap-fit in the clips 212.

A platen 218 is accommodated in the base molding 190. The platen 218 is spring biased via leaf springs 220 which engage a floor 222 of the base molding 190 for urging the stack 170 of paper against the cover 192.

The ink supply reservoir 154 includes an ink supply molding 224 formed integrally with the base molding 190. The ink supply molding 224 defines a plurality of ink supply channels 226. Each ink supply channel 226 contains a particular color of ink. In this context, the term "color" is to be understood as also including inks which are invisible in the visible spectrum such as, for example, infra red inks.

The channels 226 are closed off by a flexible bladder-like membrane 228 which is heat-sealed to the molding 224. It will be appreciated that, as ink is withdrawn from each channel 226, the associated membrane 228 collapses into the channel 226 thereby inhibiting the ingress of air into that channel 226.

Each channel 226 communicates with an ink outlet 230. Each ink outlet 230 is in the form of a rupturable seal.

As shown in greater detail in FIG. 4 of the drawings, the ink supply manifold 156 of the printer 100 includes pins 232. These pins 232 communicate with the ink supply hoses 152. When the cartridge 122 is inserted into the printer 100, and the cartridge 122 is driven home by the gear train 144, the pins 232 pierce the seals 230 to place the hoses 152 in communication with their associated ink supply channels 226.

The cartridge 122 includes a quality assurance chip 234. This chip 234 ensures correct communications between the cartridge 122 and the printer 100 and that the cartridge 122 is of the required quality. The chip 234 communicates with the printer 100 via chip contacts 236 mounted on the ink supply manifold 156 of the printer 100. Thus, when the cartridge 122 is driven home by the gear train 144, the chip 234 engages the contacts 236 for enabling communications to be established between the chip 234 and the circuit board 136 of the printer 100.

The cartridge 122 is a disposable unit so that, once its ink supply and paper supply have been depleted, the cartridge is disposed of. Alternatively, the cartridge 122 may be re-useable. In the latter case, once the supply of ink and paper in the cartridge 122 have been depleted and the cartridge 122 is ejected from the printer 100, the used, empty cartridge 122 can be taken by a user to a supplier for a partial refind or credit towards a replacement cartridge. It is to be noted that the cartridge 122 is automatically ejected from the printer 100 once its supply of paper and/or ink has been depleted.

Figure 8:
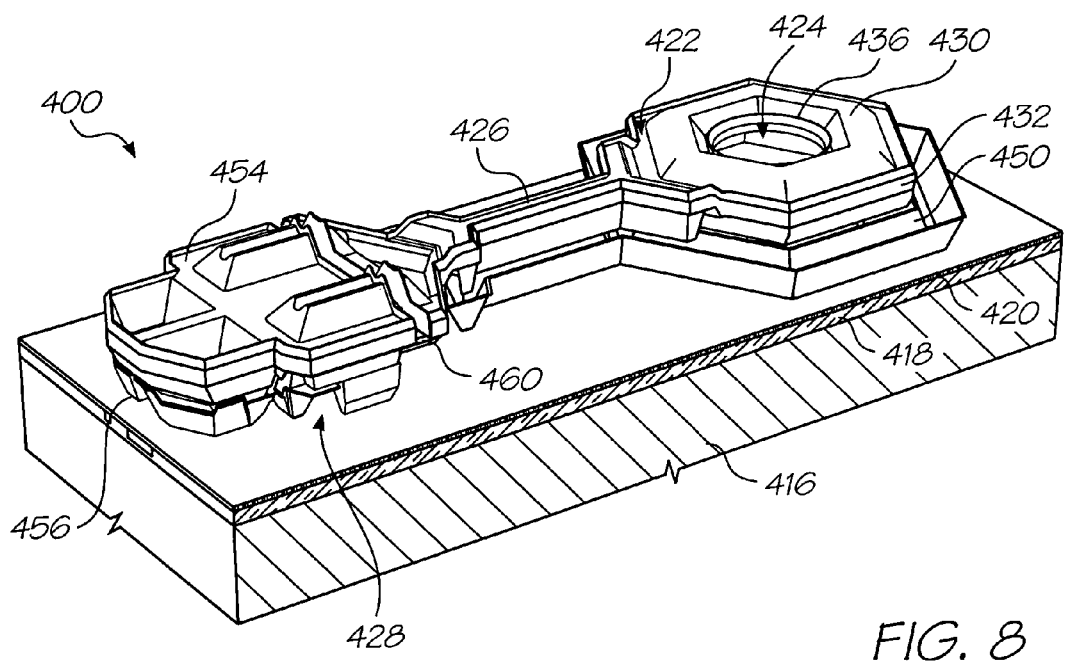
FIG. 8 shows a three dimensional, schematic view of a nozzle assembly for an ink jet printhead for the printer.

Referring to FIGS. 8 to 14 of the drawings, the printhead 300 is described in greater detail. The printhead 300 comprises an array, which will be described in greater detail below, of nozzle assemblies. Referring initially to FIG. 8 of the drawings, a nozzle assembly is illustrated and is designated generally by the reference numeral 400

The assembly 400 includes a silicon substrate or wafer 416 on which a dielectric layer 418 is deposited. A CMOS passivation layer 420 is deposited on the dielectric layer 418.

Each nozzle assembly 400 includes a nozzle 422 defining a nozzle opening 424, a connecting member in the form of a lever arm 426 and an actuator 428. The lever arm 426 connects the actuator 428 to the nozzle 422.

Figures 9, 10, 11:
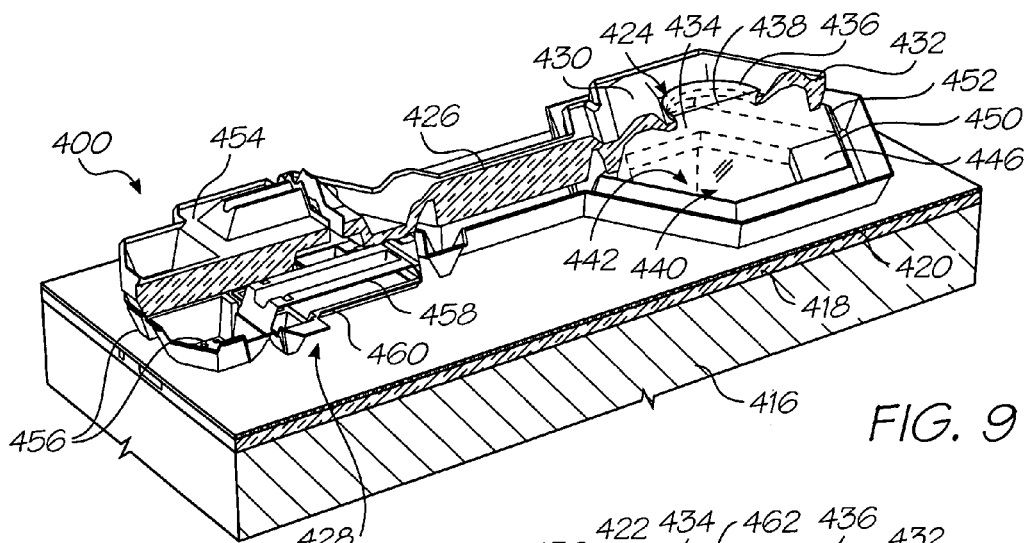
FIGS. 9 to 11 show a three dimensional, schematic illustration of an operation of the nozzle assembly of FIG. 8.

As shown in greater detail in FIGS. 9 to 11 of the drawings, the nozzle 422 comprises a crown portion 430 from which a skirt portion 432 depends. The skirt portion 432 forms part of a peripheral wall of a nozzle chamber 434. The nozzle opening 424 is in fluid communication with the nozzle chamber 434. It is to be noted that the nozzle opening 424 is surrounded by a raised rim 436 which "pins" a meniscus 438 (FIG. 9) of a body of ink 440 in the nozzle chamber 434.

An ink inlet aperture 442 (shown most clearly in FIG. 13 of the drawings) is defined in a floor 446 of the nozzle chamber 434. The aperture 442 is in fluid communication with an ink inlet channel 448 defined through the substrate 416.

A wall portion 450 bounds the aperture 442 and extends upwardly from the floor portion 446. The skirt portion 432, as indicated above, of the nozzle 422 defines a first part of a peripheral wall of the nozzle chamber 434 and the wall portion 450 defines a second part of the peripheral wall of the nozzle chamber 434.

The wall 450 has an inwardly directed lip 452 at its free end which serves as a fluidic seal which inhibits the escape of ink when the nozzle 422 is displaced, as will be described in greater detail below. It will be appreciated that, due to the viscosity of the ink 440 and the small dimensions of the spacing between the lip 452 and the skirt portion 432, the inwardly directed lip 452 and surface tension function as a seal for inhibiting the escape of ink from the nozzle chamber 434.

The actuator 428 is a thermal bend actuator and is connected to an anchor 454 extending upwardly from the substrate 416 or, more particularly, from the CMOS passivation layer 420. The anchor 454 is mounted on conductive pads 456 which form an electrical connection with the actuator 428.

The actuator 428 comprises a pair of first, active beams 458 arranged above a pair of second, passive beams 460. In a preferred embodiment, both pairs of beams 458 and 460 are of, or include, a conductive ceramic material such as titanium nitride (TiN).

Both pairs of beams 458 and 460 have their first ends anchored to the anchor 454 and their opposed ends connected to the arm 426. When a current is caused to flow through the active beams 458 thermal expansion of the beams 458 result. As the passive beams 460, through which there is no current flow, do not expand at the same rate, a bending moment is created causing the arm 426 and, hence, the nozzle 422 to be displaced downwardly towards the substrate 416 as shown in FIG. 10 of the drawings. This causes ejection of ink through the nozzle opening 424 as shown at 462 in FIG. 10 of the drawings. When the source of heat is removed from the active beams 458, i.e. by stopping current flow, the nozzle 422 returns to its quiescent position as shown in FIG. 11 of the drawings. When the nozzle 422 returns to its quiescent position, an ink droplet 464 is formed as a result of the breaking of an ink droplet neck as illustrated at 466 in FIG. 11 of the drawings. The ink droplet 464 then travels on to the print media such as a sheet of paper. As a result of the formation of the ink droplet 464, a concave meniscus is formed as shown at 468 in FIG. 11 of the drawings. This results in an inflow of ink 440 into the nozzle chamber 434 such that a new meniscus 438 is formed in readiness for the next ink drop ejection from the nozzle assembly 400.

Figure 12:
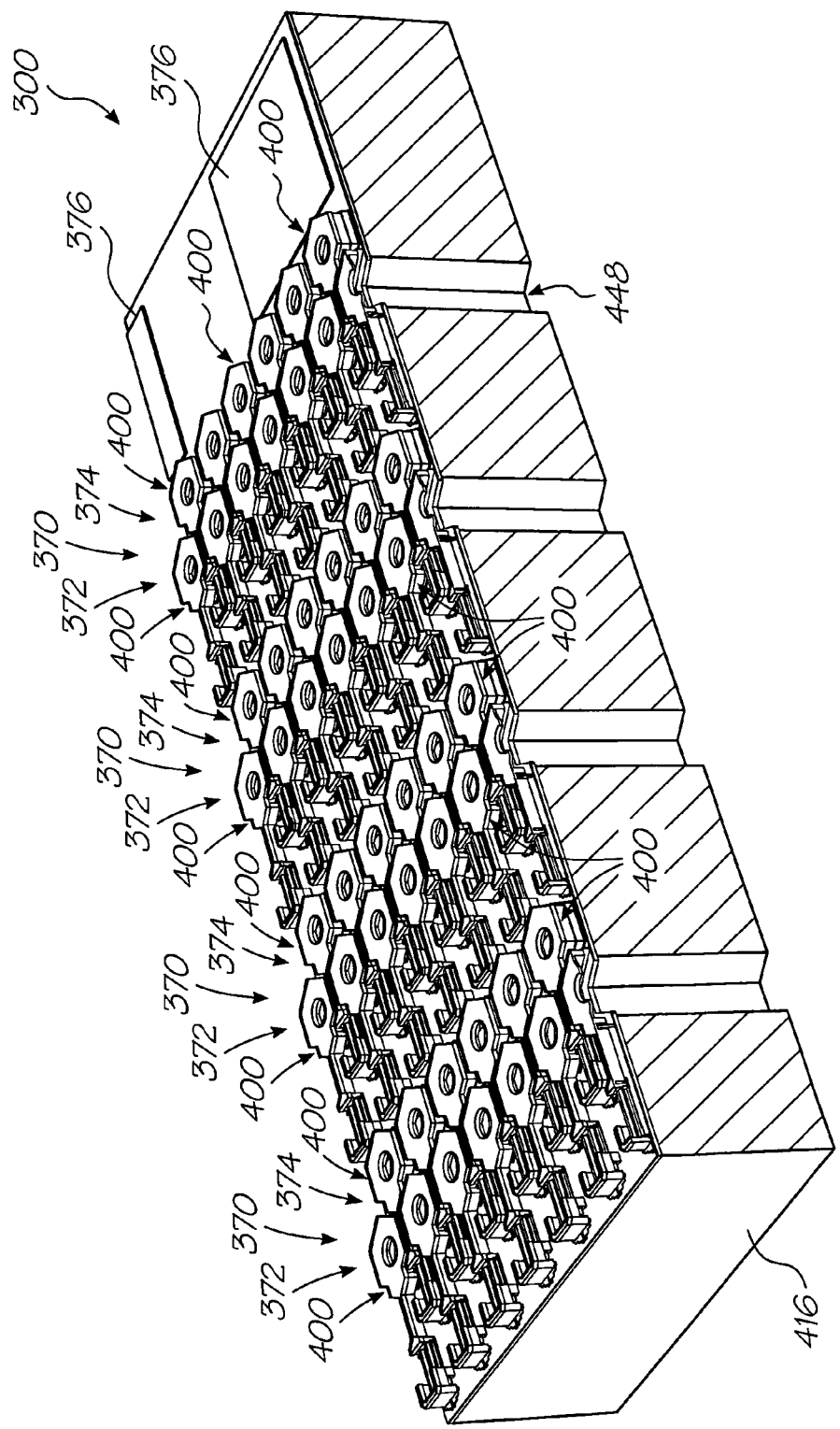
FIG. 12 shows a three dimensional view of a nozzle array constituting the printhead.
Figure 13:
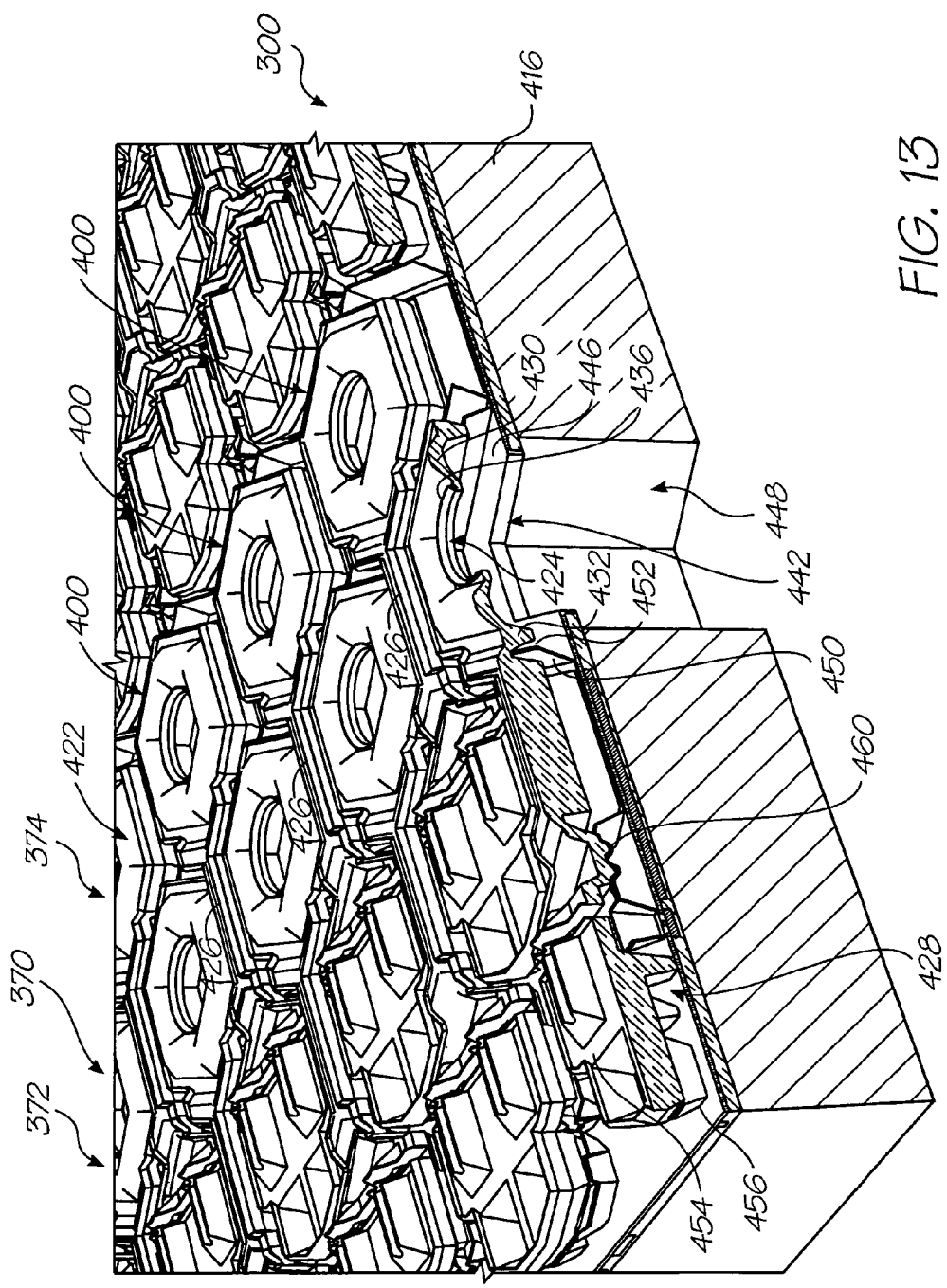
FIG. 13 shows, on an enlarged scale, part of the array of FIG. 12.
Figure 14:
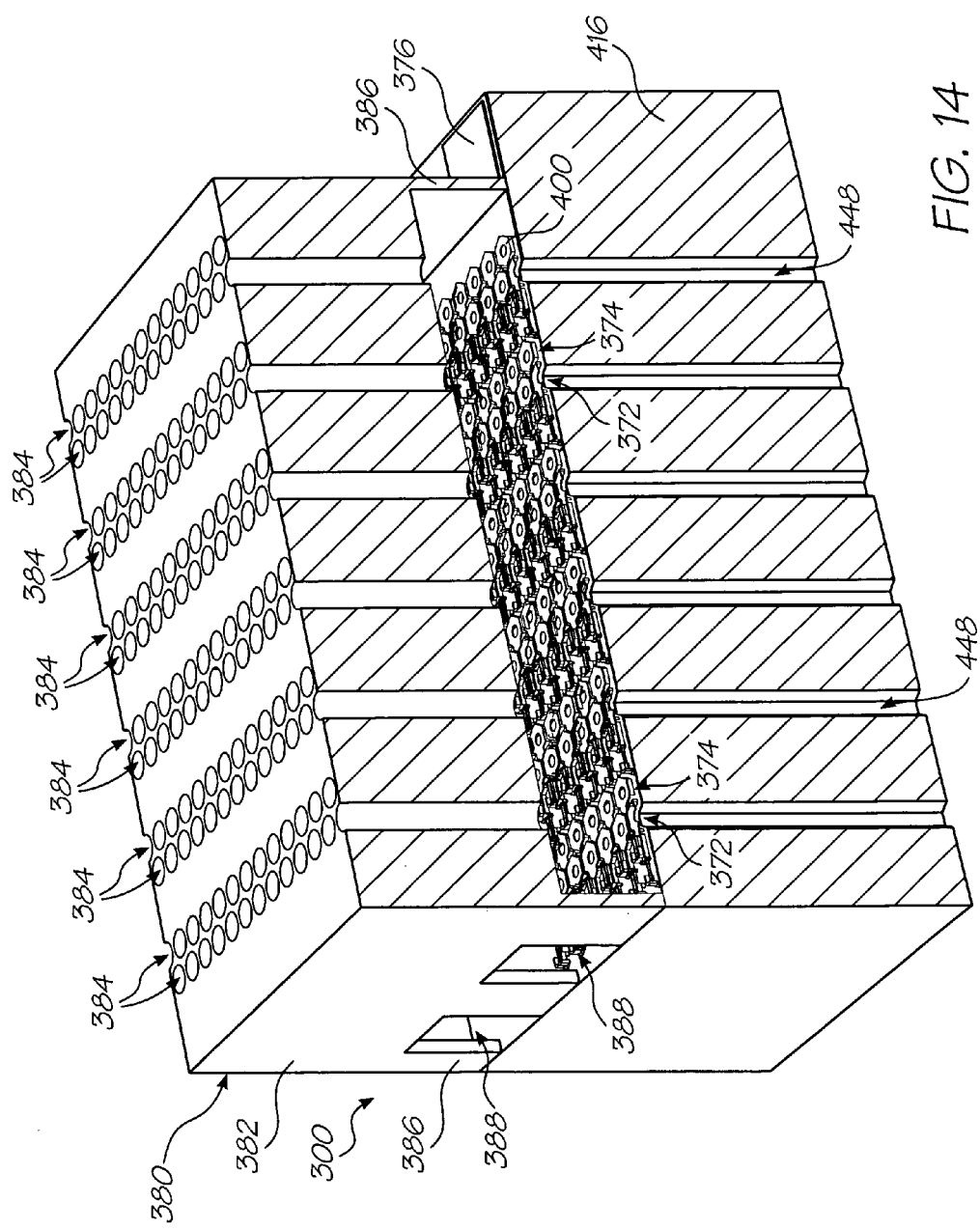
FIG. 14 shows a three dimensional view of the printhead including a nozzle guard.

Referring now to FIGS. 12 to 14 of the drawings, a part of the printhead 300 is described in greater detail. The printhead 300 is a four color printhead. Accordingly, the printhead 300 includes four groups 370 of nozzle assemblies, one for each color. Each group 370 has its nozzle assemblies 400 arranged in two rows 372 and 374. One of the groups 370 is shown in greater detail in FIG. 13 of the drawings.

To facilitate close packing of the nozzle assemblies 400 in the rows 372 and 374, the nozzle assemblies 400 in the row 374 are offset or staggered with respect to the nozzle assemblies 400 in the row 372. Also, the nozzle assemblies 400 in the row 372 are spaced apart sufficiently far from each other to enable the lever arms 426 of the nozzle assemblies 400 in the row 374 to pass between adjacent nozzles 422 of the assemblies 400 in the row 372. It will be noted that each nozzle assembly 400 is dumbbell-shaped in plan so that the nozzles 422 in the row 372 nest between the nozzles 422 and the actuators 428 of adjacent nozzle assemblies 400 in the row 374.

Further, to facilitate close packing of the nozzles 422 in the rows 372 and 374, each nozzle 422 is substantially hexagonal in plan.

Bond pads 376 are arranged on the substrate 416 to provide electrical connections, via the pads 456, to the actuators 428 of the nozzle assemblies 400. These electrical connections are formed via the CMOS layer (not shown).

A nozzle guard 380 is mounted on the substrate 416 of the printhead 300. The nozzle guard 380 includes a body member 382 having a plurality of passages 384 defined therethrough. The passages 384 are in register with the nozzle openings 424 of the nozzle assemblies 400 of the printhead 300 such that, when ink is ejected from any one of the nozzle openings 424, the ink passes through the associated passage 384 before striking the print media.

The body member 382 is mounted in spaced relationship relative to the nozzle assemblies 400 by limbs or struts 386. One of the struts 836 has air inlet openings 388 defined therein.

When the printhead 300 is in operation, air is charged through the inlet openings 388 to be forced through the passages 384 together with ink travelling through the passages 384. The purpose of the air is to maintain the passages 384 clear of foreign particles. A danger exists that these foreign particles, such as dust particles, could fall onto the nozzle assemblies 400 adversely affecting their operation. With the provision of the air inlet openings 388 in the nozzle guard 380 this problem is, to a large extent, obviated.

Figure 17:
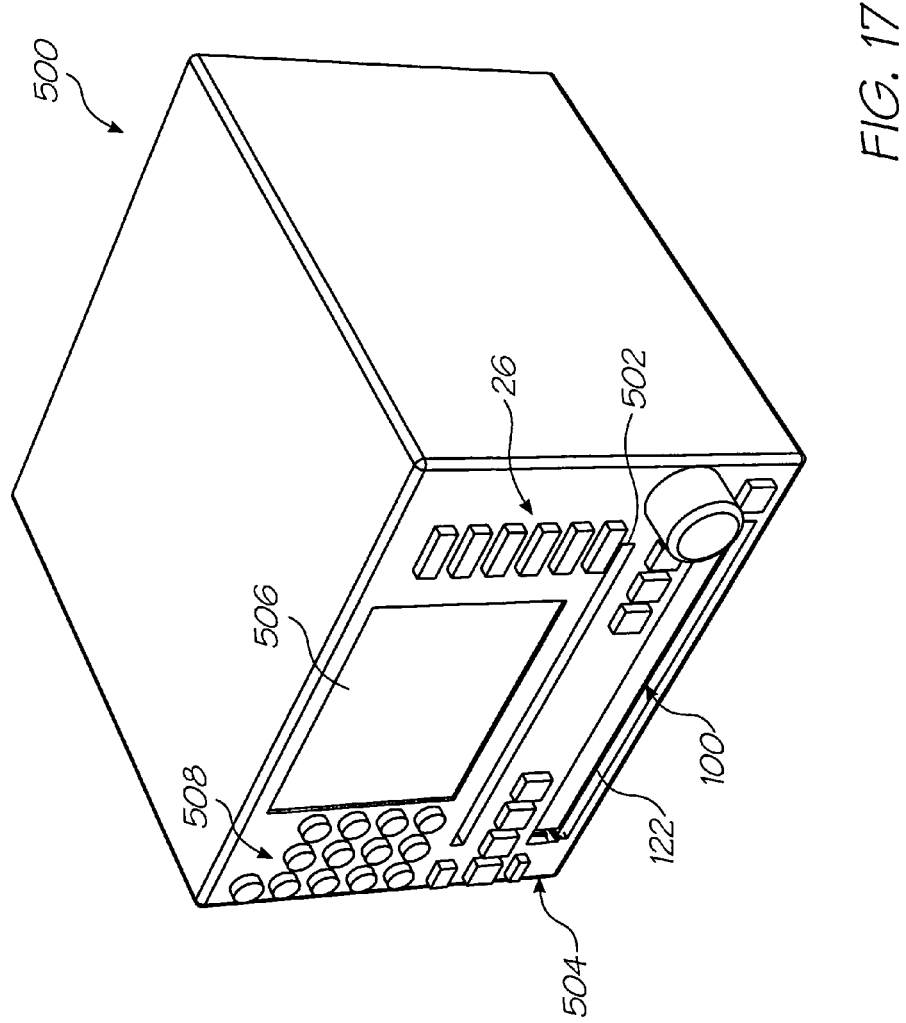
FIG. 17 shows a three dimensional view of an implementation of the information retrieval system.

In another embodiment of the invention, the printer 100 is built into and forms part of an in-car entertainment (ICE) unit 500, as shown in FIG. 17 of the drawings.

The ICE unit 500, in addition to a CD player 502 and a radio having controls 504, includes a fill color LCD 506. The unit 500 functions as a satellite navigation unit and may also be used for receiving television signals. The unit 500 incorporates a printer 100 of the type described above. The unit 500 includes a bank of control buttons 508. This bank of buttons 508 constitutes GPS controls and is used for satellite navigation purposes. In addition, the unit includes the user terminal 26 which is provided for controlling the printer 100 and the content printed by the printer 100.

In use, the current location of the vehicle is determined by the receiver 18. These location data are fed on the lines 20 to the map retrieval sub-system 22 and the locality data retrieval sub-system 24. The location data are typically a set of geographical co-ordinates with enough resolution to specify the location of the vehicle to within an accuracy of approximately 10 meters of its actual location.

The map retrieval sub-system 22 uses the location data to retrieve map data representing an area that is within walking distance of the current location of the vehicle. The map data retrieved are, accordingly, preferably centred on the current location of the vehicle.

The locality data retrieval sub-system 24 uses the location data to access current information relating to the area in which the vehicle is located. Typically, the types of information retrieved depend on a number of factors including the time of day, the day of the week prevailing weather conditions and information specifically requested by the user using the user terminal 26.

Depending on the complexity of the system, the sub-system 24 may obtain the information locally from within the vehicle via a data storage system. However, if a remote server is used then it is likely that the remote server would make a decision regarding which information to transmit based on advance knowledge of factors, for example, due to the user being a member of a subscription service. As indicated, it is also possible for the user to enter filtering information via the user terminal 26 to be provided with specific information in which the user may be interested.

The information retrieved by the sub-systems 22 and 24 is forwarded to the layout engine 28. As previously described, the layout engine 28 manipulates the information to provide one or more complete page descriptions in a suitable page description language.

Each page description is forwarded to the rasterization module 34 and the page compression module 38 to produce one or more pages of formatted data consisting of map and information pertaining to the locality in which the vehicle is located.

Once these pages have been printed by the printer 100, they may then be read by the user in order to assist in deciding where the user would like to go, what the user would like to do whilst in the locality, etc. Since the printed pages are portable, the user may also take the printed pages with him or her to serve as a navigational aid which may be of use, for instance, if the user is unfamiliar with the locality. Also, the pages can be used to obtain details of further activities within the locality while the user spends time in the locality.

A typical application, which may be implemented in hire cars, is the use of the system 10 by a tourist. A tourist using this system 10 would leave the tourist's point of origin and drive to the location. On arrival at the destination, the tourist would park the vehicle and actuate a control on the user terminal 26. The tourist may have elected to enter a user profile previously and, based on this user profile, a set of locality data and a corresponding map are retrieved, combined and printed by the printer 100. Using this printed information the tourist can then undertake an exploration of the locality.

Another example would be a user looking for a certain type of establishment. The user could enter the details of the types of establishment, for example, restaurants, by way of the user terminal 26 either before commencement of the journey or on arrival at the destination. By actuating a suitable controller on the user terminal 26 after arrival in the locality, the system 10 produces locality and map data directing the user to a set of establishments matching the requirements and which are within the locality. For example, the user may wish to obtain information regarding the location of restaurants serving Asian style food in the locality.

Still another application of the system 10 is the issue of discount coupons. In the case of a coupon delivery application of the system 10, the system retrieves and prints relevant discount coupons to attract a user to a particular set of participating retail establishments in the locality. For example, if a user parks his or her vehicle in a shopping centre the locality data retrieved by the sub-system 24 could represent a set of discount coupons from participating retail establishments. Map data representative of the locations of these establishments may be retrieved by the subsystem 22. The map data and the discount coupons are then printed via the printer 100.

Accordingly, it is an advantage of the invention that System 10 is provided which, to a large extent, does not require any forward planning by a user travelling to a particular locality. A further advantage of the invention is that, where the user has parked his or her vehicle in an unfamiliar location in the locality, the system 10 can be used to highlight on the map printed on the printer 100 where the vehicle has been parked in the locality so that the user can later find his or her vehicle.

Still further, information can be printed which will direct a user in an unfamiliar locality to places of interest. If a user profile had previously been entered, the types of places of interest which may be printed on the map may be limited to those for which the user has previously indicated a preference. Instead of having to have previously entered the profile, the profile could be entered, at the locality, by means of the user terminal 26.

Possibly the biggest advantage of the invention is that printed data regarding the locality are provided at the locality thereby enabling the user to carry the information with the user.

Although the invention has been described with reference to a number of specific embodiments, it will be appreciated that the invention can be embodied in many other forms. It will further be understood that any reference herein to known prior art does not unless the contrary indication appears, constitute an admission that such prior art is commonly known by those skilled in the art to which the invention relates.

The invention claimed is:

1. An information retrieval system for retrieving information relating to a locality, the system being associated with a motor vehicle and including:
 a data collecting means for collecting data relating to a location of the motor vehicle and the locality in which the motor vehicle is located;
 a processing means, in communication with said data collecting means, for processing said collected data to provide formatted data suitable for printing; and
 a printing unit disposed within an entertainment unit of the motor vehicle, for printing said formatted data to provide information relating to said locality.

2. The system of claim 1 in which the printing unit is installed in said motor vehicle.

3. The system of claim 1 in which the data collecting means includes a location determining unit for determining the location of the motor vehicle.

4. The system of claim 3 in which the location determining unit provides the location of the motor vehicle as a set of co-ordinates.

5. The system of claim 4 in which the location determining unit comprises a global positioning system (GPS) receiver.

6. The system of claim 3 in which the data collecting means further includes a locality data retrieval unit which retrieves data relating to the location in response to the receipt of data from the location determining unit.

7. The system of claim 6 in which the locality data retrieval unit comprises a locality depicting sub-system which provides data relating to a representation of the locality.

8. The system of claim 7 in which the location data retrieval unit further comprises a locality information sub-system which provides data relating to at least one feature of the locality.

9. The system of claim 8 in which the locality information sub-system is addressable by a user to filter the data to be made available relating to features of the locality.

10. The system of claim 7 in which the processing means includes a layout engine in communication with the locality data retrieval unit.

11. The system of claim 10 in which the layout engine lays out data elements to be communicated to the printer so that, when printed on a suitable print media, the data are presented in a visually discernible form.

12. The system of claim 10 in which the processing means comprises a data manipulating means in communication with the layout engine for manipulating the data to provide the formatted data.

13. The system of claim 12 in which the printing unit includes a printer controller, for receiving the formatted data to be printed, and a printer.

14. The system of claim 13 in which the printer is a full color printer.

15. The system of claim 14 in which said printer is a photo quality color printer.

16. The system of claim 14 in which the printer is an ink jet printer.

17. The system of claim 16 in which the printer comprises a pagewidth ink jet printhead.

18. The system of claim 17 in which the printhead comprises an array of nozzles, said array being fabricated by microelectromechanical techniques.

* * * * *